United States Patent
Kim et al.

(10) Patent No.: US 7,661,419 B2
(45) Date of Patent: Feb. 16, 2010

(54) CUTTING SEGMENT FOR DIAMOND TOOL AND DIAMOND TOOL HAVING THE SEGMENT

(75) Inventors: Soo-Kwang Kim, Portofino, CA (US); Hee-Dong Park, Kyungki-do (KR); Jong-Ho Kim, Kyungki-do (KR); Joon-Ho Chang, Kyungki-do (KR)

(73) Assignees: Ehwa Diamond Industrial Co., Ltd., Osan, Kyungki-do (KR); General Tool, Inc., Irvine, CA (US)

( * ) Notice: Subject to any disclaimer, the term of this patent is extended or adjusted under 35 U.S.C. 154(b) by 0 days.

(21) Appl. No.: 11/911,798

(22) PCT Filed: Apr. 20, 2006

(86) PCT No.: PCT/KR2006/001468

§ 371 (c)(1),
(2), (4) Date: Feb. 22, 2008

(87) PCT Pub. No.: WO2006/112670

PCT Pub. Date: Oct. 26, 2006

(65) Prior Publication Data

US 2008/0171505 A1    Jul. 17, 2008

(30) Foreign Application Priority Data

Apr. 20, 2005    (KR) .................. 10-2005-0032909

(51) Int. Cl.
*B28D 1/12* (2006.01)
(52) U.S. Cl. .................. 125/22; 125/13.01; 125/15; 451/542; 451/546; 451/547
(58) Field of Classification Search .......... 51/295, 51/307, 309; 125/13.01, 15, 18, 22; 175/420.2, 175/434; 407/113; 451/542, 546, 547, 540
See application file for complete search history.

(56) References Cited

U.S. PATENT DOCUMENTS 2,811,960 A * 11/1957 Fessel .................. 125/15
4,883,500 A * 11/1989 Deakins et al. ........... 51/298

(Continued)

FOREIGN PATENT DOCUMENTS

JP    60-0092406    5/1985

(Continued)

*Primary Examiner*—Timothy V Eley
(74) *Attorney, Agent, or Firm*—McDermott Will & Emery LLP (57) ABSTRACT

The invention relates to a cutting segment of a diamond tool for cutting or drilling a brittle workpiece such as stone, bricks, concrete and asphalt, and a diamond tool having the same. The invention allows superior cutting rate and lengthy useful life without suffering from R wear during cutting. In the cutting segment, a number of diamond particles are arranged in a plurality of plate-shaped layers stacked perpendicular to a cutting direction. Each of the diamond particle layers has a plurality of particle rows on a cutting surface. Further, at least two of the diamond particle layers are superimposed on at least one side of the cutting segment seen from the front of the cutting segment in cutting direction. The invention ensures uniform cutting by significantly reducing R wear that arises during cutting and thus enables superior cutting rate and longer useful life.

22 Claims, 10 Drawing Sheets

U.S. PATENT DOCUMENTS

| | | | |
|---|---|---|---|
| 5,049,165 A * | 9/1991 | Tselesin | 51/295 |
| 5,092,082 A * | 3/1992 | Padberg et al. | 451/548 |
| 5,433,187 A * | 7/1995 | Hayasaka et al. | 125/15 |
| 5,620,489 A * | 4/1997 | Tselesin | 51/293 |
| 5,725,421 A * | 3/1998 | Goers et al. | 451/303 |
| 6,159,286 A | 12/2000 | Sung | |
| 6,626,167 B2 * | 9/2003 | Kim et al. | 125/15 |
| 7,124,753 B2 * | 10/2006 | Sung | 125/12 |
| 7,134,430 B2 * | 11/2006 | Kim et al. | 125/22 |
| 7,261,925 B2 * | 8/2007 | Nesbitt | 427/470 |
| 7,337,775 B2 * | 3/2008 | Kim et al. | 125/22 |

FOREIGN PATENT DOCUMENTS

| | | |
|---|---|---|
| JP | 03-161278 | 7/1991 |
| KR | 1999-011778 | 2/1999 |
| KR | 2003-0027434 | 4/2003 |
| KR | 2003-0067394 | 8/2003 |
| KR | 2004-0006361 | 1/2004 |
| WO | WO 03/066275 A1 * | 8/2003 |
| WO | WO2005/014243 A2 | 2/2005 |

* cited by examiner

CUTTING SEGMENT FOR DIAMOND TOOL AND DIAMOND TOOL HAVING THE SEGMENT

TECHNICAL FIELD

The present invention relates to a cutting segment of a diamond tool for cutting or drilling a brittle workpiece such as stone, bricks, concrete and asphalt, and a diamond tool having the cutting segment. More particularly, the present invention relates to a cutting segment having at least two diamond particle layers superimposed on at least one side thereof, and a diamond tool having the cutting segment.

BACKGROUND ART

The invention is concerned with Korean Patent Application Nos. 2001-60680 and 2003-55532.

An artificial diamond (hereinafter referred to as "diamond") was invented in the 1950s. The diamond, which is known to have the highest hardness out of materials in the earth, has been accordingly used for cutting and grinding tools due to such properties.

Especially, the diamond has been broadly used in a stone processing field where stone such as granite and marble is cut and ground, and in a construction field where a concrete structure is cut and ground.

Typically, a diamond tool comprises segments having diamond particles dispersed thereon and a metal core having the segments fixed thereto.

Figure 1:
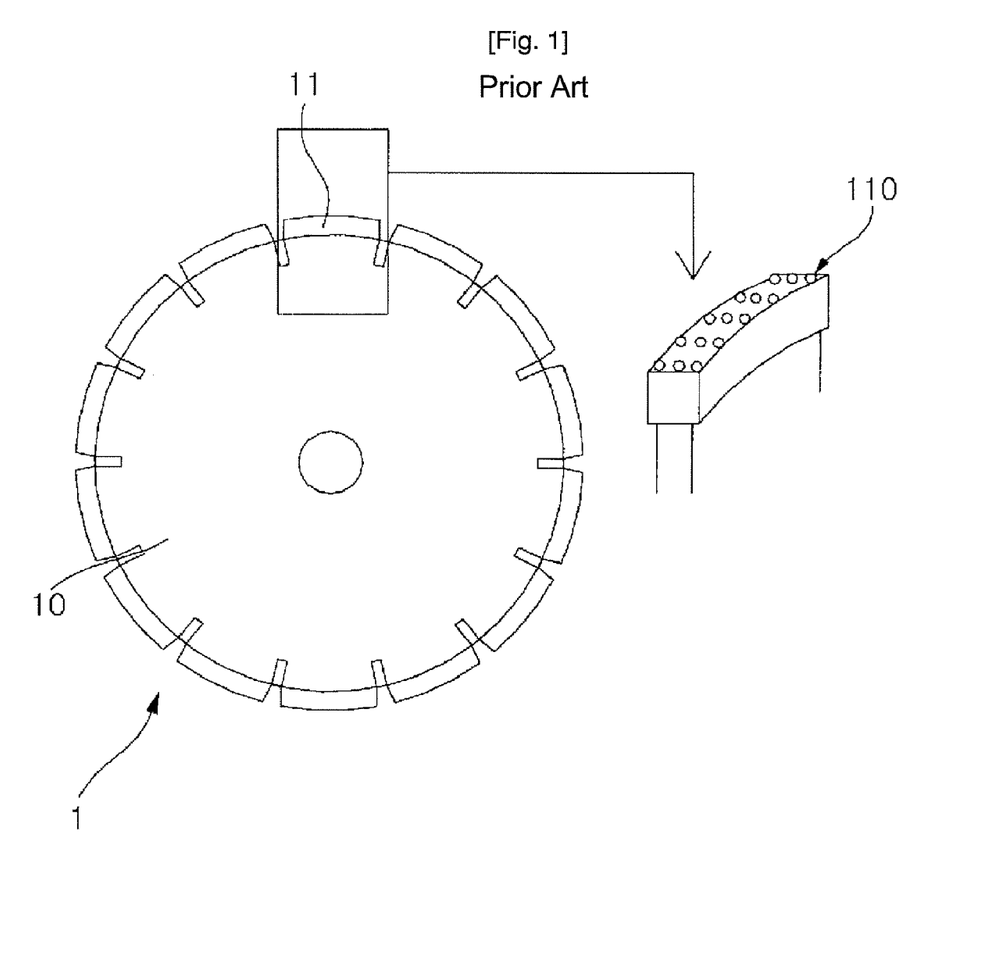
FIG. 1 is an example of a diamond tool having diamond particles regularly dispersed on a cutting surface of cutting segments.

FIG. 1 illustrates an example of a segment type diamond tool having diamond particles arranged regularly.

The inventors of this invention developed the technology of arranging diamonds regularly in a segment to enhance cutting rate and useful life of a cutting tool, as shown in FIG. 1. Details thereof are disclosed in Korean Patent Application Nos. 2001-60680, and 2002-7568.

As shown in FIG. 1, the segment type diamond tool 1 includes a plurality of segments 11 fixed to a disk-shaped metal core 10, each segment 11 having diamond particles 110 regularly dispersed thereon.

Figure 2:
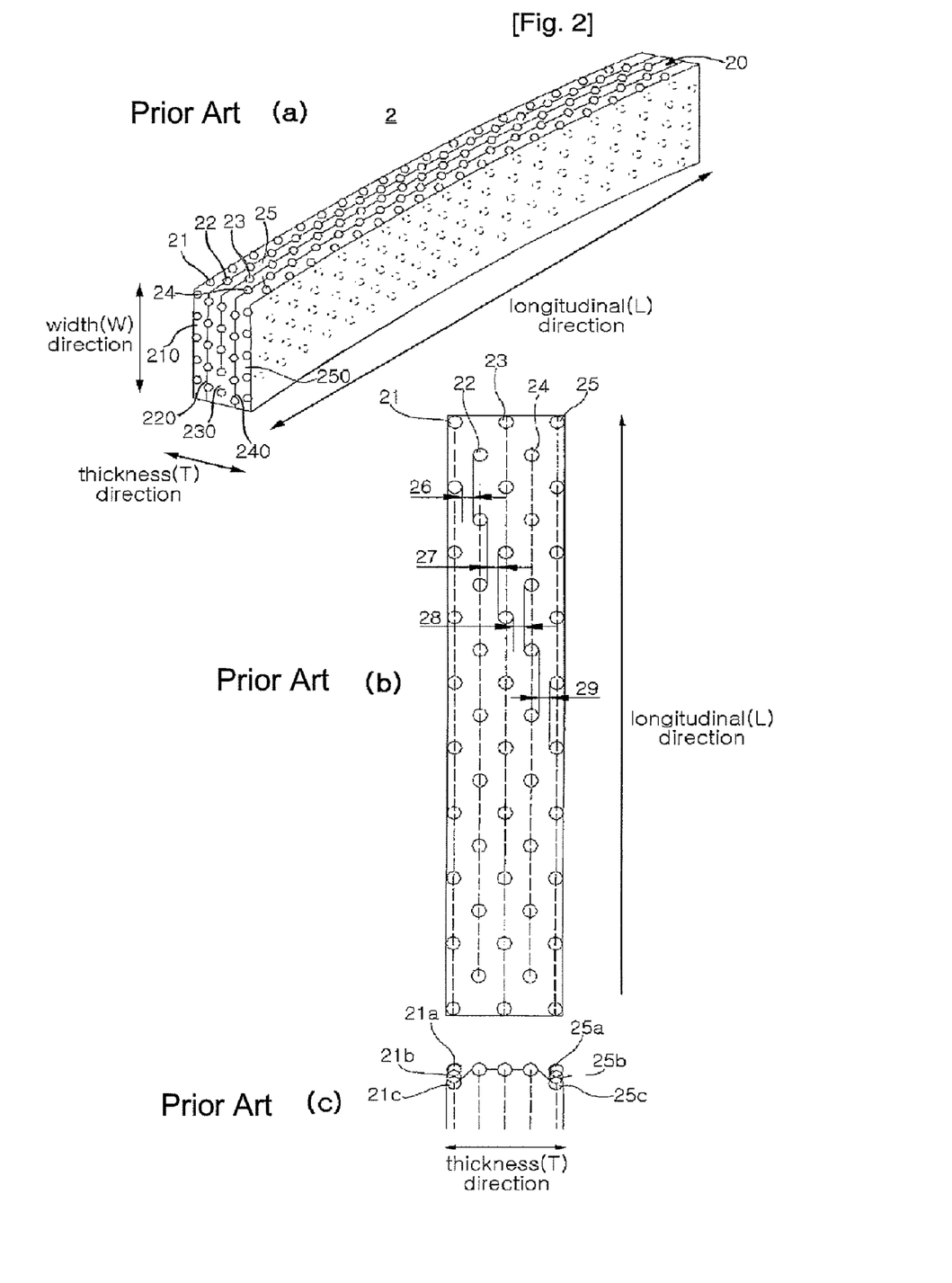

FIG. 2 shows an example of a cutting segment having diamond particles regularly arranged.

As shown in FIG. 2(a), the cutting segment 2 has a plurality of diamond particle layers 210 to 250 arranged at uniform spaces in a thickness direction thereof. The diamond particle layers each have a plurality of particle rows on a cutting surface 20 during cutting. Also, between the diamond particle layers 210 to 250, blank sections 26 to 29 are formed as shown in FIG. 2(b).

In case of cutting a workpiece with the diamond tool having the cutting segment of FIG. 2, diamond particles constituting diamond particle layers 210 to 250 are uniformly protruded in rows 21 and 25 from the cutting surface during cutting. At this time, diamond particle rows 21 and 25 disposed at both the cutting surface and the side of the cutting segment contact the workpiece at both sides and thus sustain biggest load.

Therefore, these diamond particle rows 21 and 25 carry out cutting under more hostile conditions than inside diamond particle rows 22 and 23.

Consequently, with the cutting going on, as illustrated in FIG. 2(c), upper diamond particle rows 21a, 21b, 25a and 25b arranged on the side fall off easily and their underlying diamond particle rows 21c and 25c newly perform cutting. This causes the side of the cutting segment to suffer from rounding wear (hereinafter referred to as "R" wear), also decreasing useful life of the cutting segment. Technologies suggested to reduce such R wear include increasing a concentration of diamond particles arranged at the side, using different-sized particles or using metal binder having higher hardness for the side than that for the inside.

However, the aforesaid conventional technologies disadvantageously entail a complex manufacturing process and do not lead to sufficient reduction in R wear.

DISCLOSURE OF INVENTION

Technical Problem

The present invention has been made to solve the foregoing problems of the prior art and it is therefore an object of the present invention to provide a cutting segment of a diamond tool having at least two diamond particle layers superimposed on the side so as to ensure superior cutting rate and lengthy useful life without suffering from R wear during cutting.

It is another object of the invention to provide a diamond tool having the cutting segment.

Technical Solution

According to an aspect of the invention for realizing the object, there is provided a cutting segment of a diamond tool comprising: a number of diamond particles arranged in a plurality of plate-shaped layers stacked perpendicular to a cutting direction, each of the diamond particle layers having a plurality of particle rows on a cutting surface, wherein at least two of the diamond particle layers are superimposed on at least one side of the cutting segment seen from the front of the cutting segment in cutting direction.

Preferably, the diamond particle layers positioned inside the cutting segment are arranged so that at least one successive blank section is formed along the cutting direction.

According to another aspect of the invention for realizing the object, there is provided a diamond tool having the cutting segment.

The invention will be explained in greater detail hereunder. In the cutting segment of the diamond tool of the invention, at least two of the diamond particle layers are superimposed on at least one side of the cutting segment seen from the front of the cutting segment in cutting direction, thereby reducing R wear on the cutting segment during cutting. Also, a gap between successive blank sections formed along the cutting direction is adjusted to increase cutting rate and useful life, ensuring effective use of every diamond particle.

The blank sections formed between the diamond particle layers have no diamond particles but only metal binder.

The blank sections successively placed along the cutting direction can be formed between diamond particle layers successively arranged along the cutting direction. Further, the blank sections can be formed between diamond particle layers intermittently arranged along the cutting direction.

BRIEF DESCRIPTION OF THE DRAWINGS

The above and other objects, features and other advantages of the present invention will be more clearly understood from the following detailed description taken in conjunction with the accompanying drawings, in which:

FIG. 2 is a schematic view illustrating a cutting segment having diamond particles regularly dispersed, in which (a)

shows a schematic view of the cutting segment, (b) shows a schematic view of a cutting surface of the cutting segment, and (c) shows a front sectional view of the cutting segment along the cutting direction during cutting;

MODE FOR THE INVENTION

Preferred embodiments of the present invention will now be described in detail with reference to the accompanying drawings.

Figure 3:
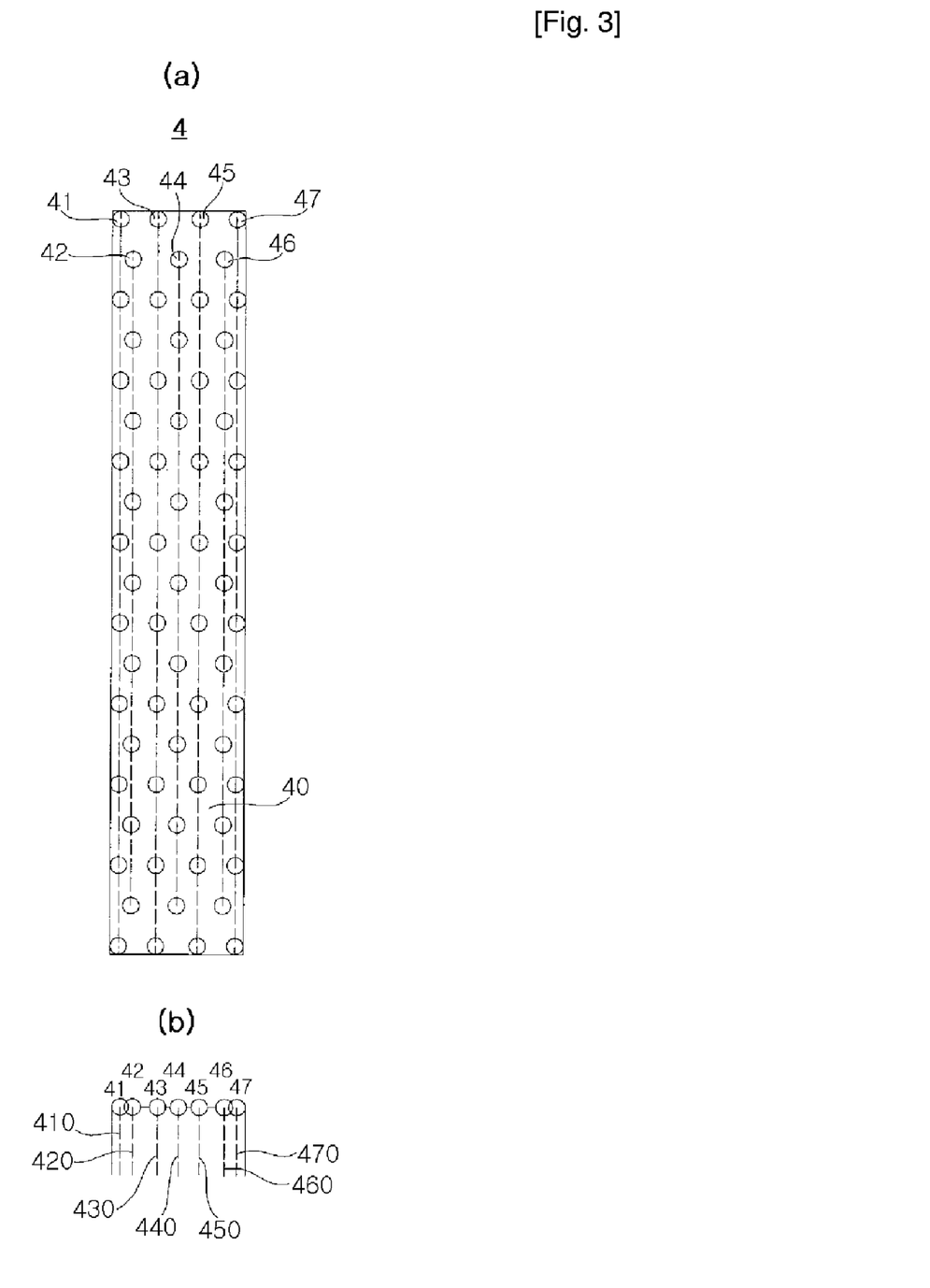
FIG. 3 is a schematic view illustrating a cutting segment according to the invention, in which (a) shows a schematic view of a cutting surface, and (b) shows a sectional front view of the cutting segment along the cutting direction.

FIG. 3 illustrates a preferred example of a cutting segment of a diamond tool according to the invention.

As shown in FIG. 3, the cutting segment 4 of the invention has a number of diamond particle layers 410 to 470 arranged perpendicular to a cutting direction (thickness direction). The particle layers each have a plurality of particle rows on a cutting surface 40 during cutting.

Outermost diamond particle layers 410 and 470 of the cutting segment 4 and adjacent diamond particle layers 420 and 460 are arranged so that outermost diamond particle rows 41 and 47 and adjacent diamond particle rows 42 and 46 are superimposed respectively to form overlapped cutting grooves on a workpiece. Also, diamond particle layers 430 to 450 positioned inside the cutting segment are spaced apart uniformly so that at least one blank section is formed between the diamond particle layers 420 to 460.

In the cutting segment 4, the diamond particle layers 410 to 470 each are extended successively along the cutting direction, and the diamond particle rows are arranged successively along the cutting direction.

The side diamond particle layers 410, 420 of the cutting segment 4 are superimposed with diamond particle layers 460 and 470, respectively, so that outermost and uppermost (cutting surface 40) diamond particle rows 41 and 47 of the cutting segment are protected from falling off. The cutting segment 4 of the invention can maintain its shape without suffering from R wear during cutting as shown in FIG. 3 (b).

Preferably, to have at least two of the diamond particle layers superimposed on the side of the cutting segment, a depression may be formed on the side through a forming or sintering process in fabrication of the cutting segment. An explanation will be given hereunder in greater detail.

Figure 4:
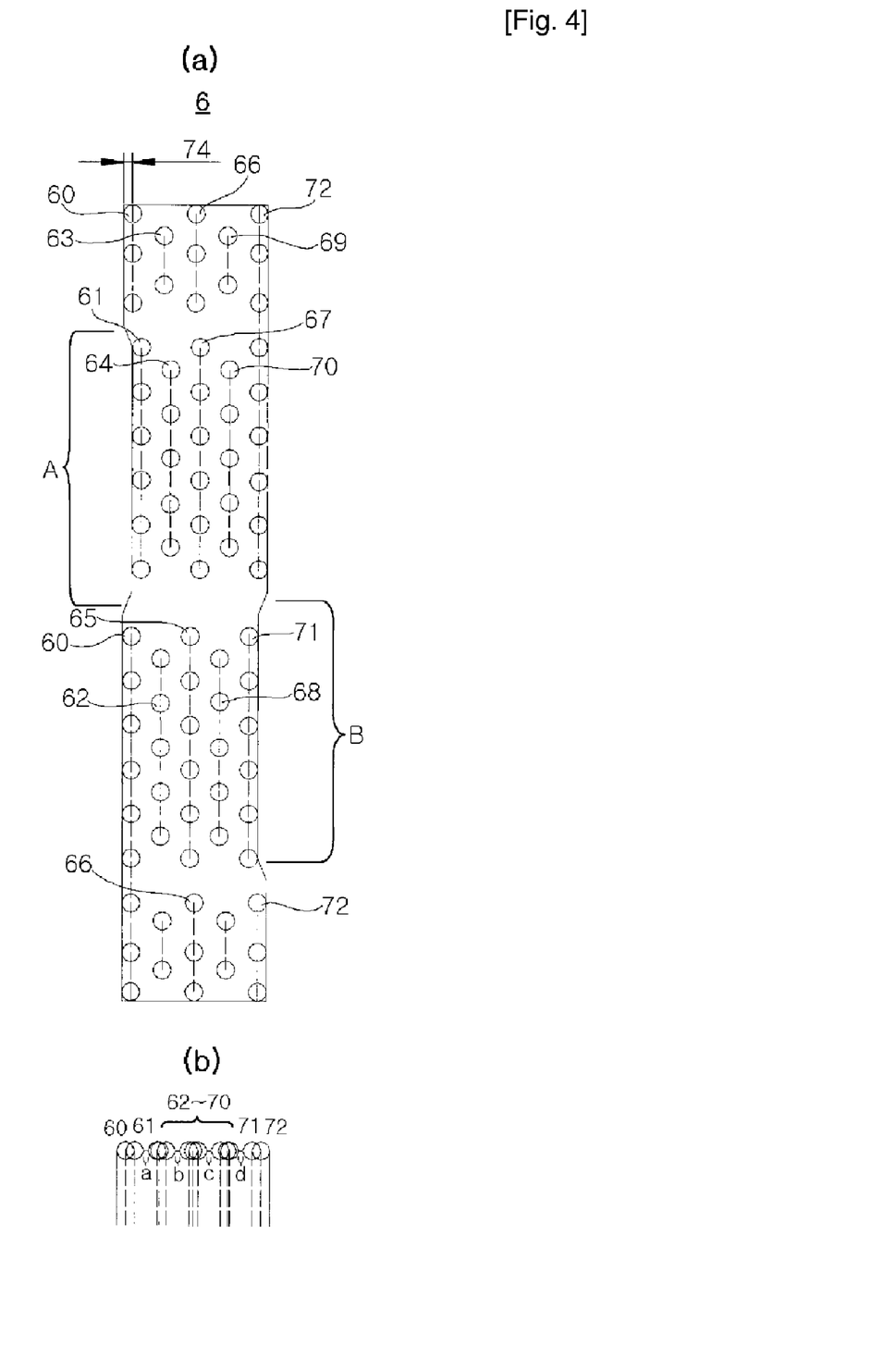
FIG. 4 is a schematic view illustrating another example of the cutting segment according to the invention, in which (a) shows a schematic view of a cutting surface, and (b) shows a front sectional view of the cutting segment along the cutting direction during cutting.

FIG. 4 illustrates an example of the cutting segment having depressions formed on the side according to the invention.

As shown in FIG. 4, areas A and B of the cutting segment 6 are defined by depressions having a depth smaller than a diameter of the outermost diamond particles of the cutting segment.

Depressions are formed on the side of the cutting segment as just described so that outermost diamond particle rows 61 and 71 in regions defined by the depressions and outermost diamond particle rows 60 and 72 in regions without depressions form overlapped cutting grooves on a workpiece.

In the cutting segment 6, the diamond particle layers each are extended intermittently along the cutting direction, and the diamond particle rows 60 to 72 are arranged intermittently along the cutting direction.

Four blank sections are successively arranged along the cutting direction between diamond particle layers placed inside the cutting segment 6.

As shown in FIG. 4(b), the diamond particle layers are arranged in the cutting segment 6 so that side diamond particle layers (diamond rows on the cutting surface) are superimposed. This prevents the outermost and uppermost diamond particle rows 60 and 72 of the cutting segment from falling off. Therefore, the cutting segment 6 of the invention can maintain its shape without going through R wear during cutting as shown in FIG. 4(b).

Meanwhile, in case of forming depressions as described above according to the invention, the depth 74 of depressions can be varied to adjust gaps a, b, c and d between the successive blank sections formed between the successive diamond particle layers.

Figure 5:
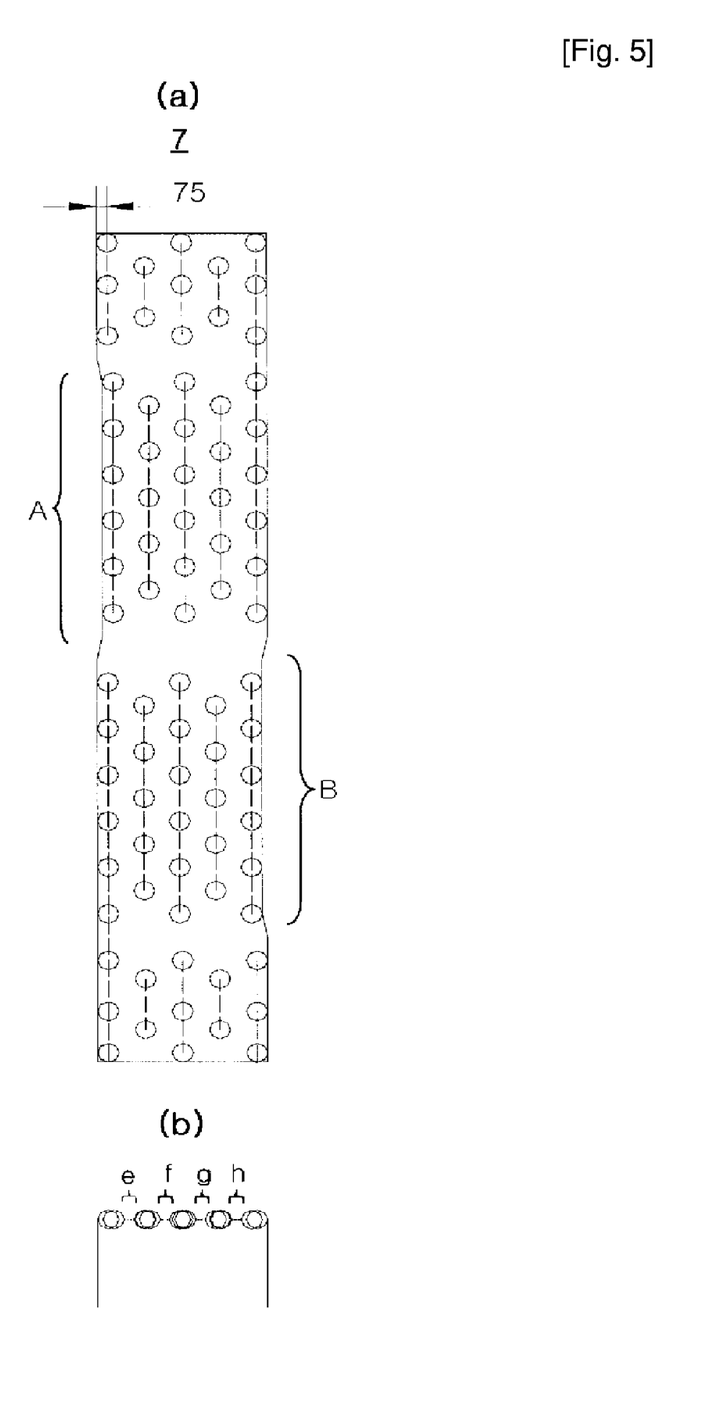
FIG. 5 is further another example of the cutting segment according to the invention.

FIG. 5 shows a cutting surface of another cutting segment of the invention having depressions with a depth smaller than that of the depressions in FIG. 4.

When FIGS. 4 and 5 are compared, the depth 75 of depressions in FIG. 5 is smaller than that 74 of the depressions in FIG. 4. As a result, gaps e, f, g and h between successive blank sections between diamond particle rows of FIG. 5 are greater than those a, b, c and d of the successive blank sections of FIG. 4.

Accordingly, a greater depth of the depressions leads to smaller gaps between the successive blank sections. The blank sections where only binder is present suffer less abrasion, thus lengthening useful life.

On the contrary, a smaller depth of the depressions leads to greater gaps between the blank sections. Therefore, the blank sections where only binder is present suffer greater abrasion so that debris are discharged well, improving cutting rate.

In this fashion, useful life and cutting rate can be controlled by adjusting the depth of depressions.

Figure 6:
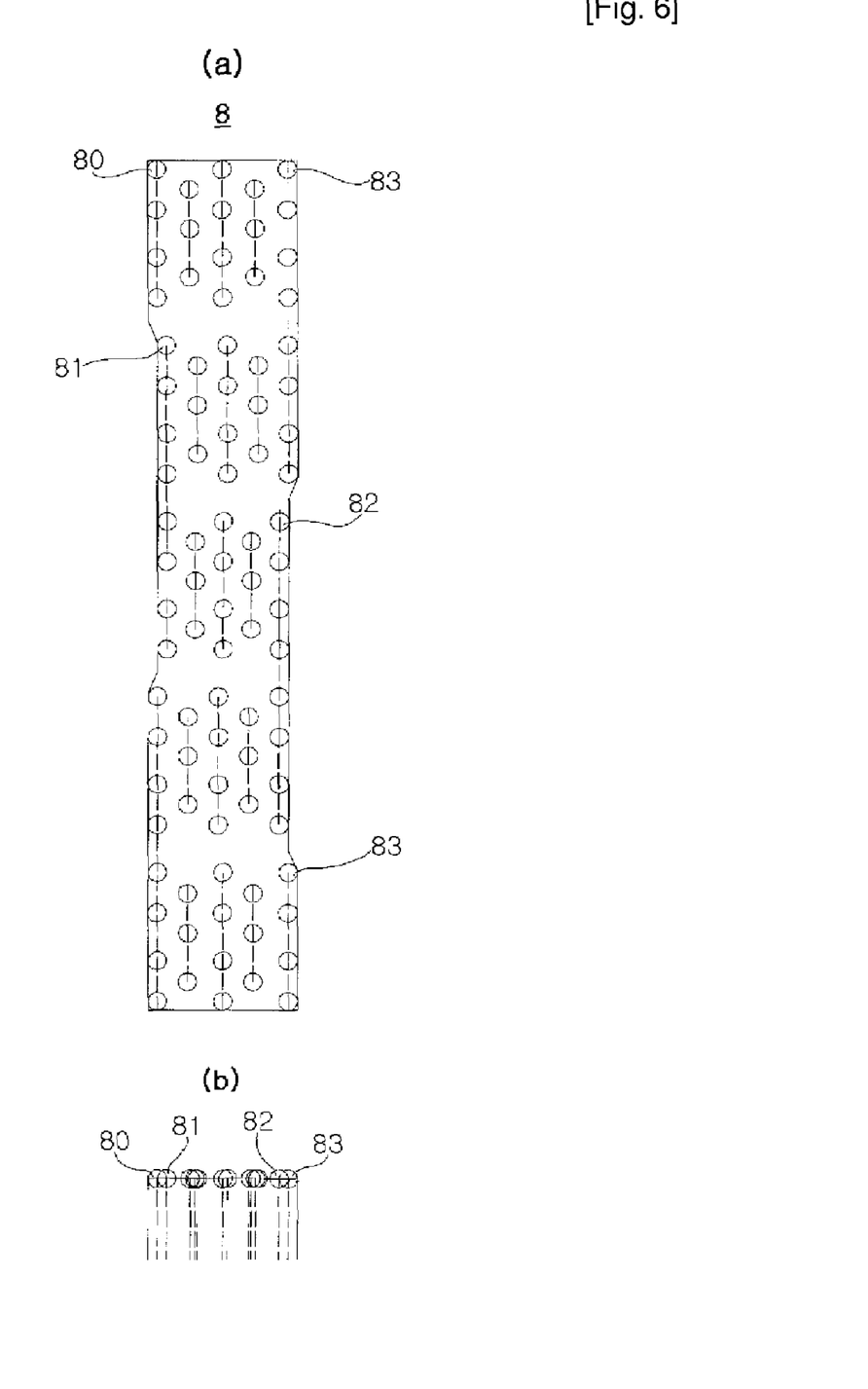
FIG. 6 is further another example of the cutting segment according to the invention, in which (a) shows a schematic view of a cutting surface and (b) shows a front sectional view of the cutting segment along the cutting direction during cutting.

FIG. 6 illustrates another example of the cutting segment having depressions formed on the side.

As shown in FIG. 6(a), the cutting segment 8 has the depressions formed on both sides and opposed ones of the depressions are overlapped with each other.

The depressions are formed on the sides of the cutting segment 8 as described above so that outermost diamond particle rows 80 and 83 positioned on the side of the cutting segment are superimposed with adjacent diamond particle rows 81 and 82 when seen from the front of the cutting segment in cutting direction as shown in FIG. 6(b).

That is, since diamond particle rows are superimposed as just described, cutting grooves formed on the workpiece thereby are overlapped with each other.

In the cutting segment 8, the diamond particle layers each are extended intermittently along the cutting direction and diamond particle rows 80,81,82 and 83 are arranged intermittently along the cutting direction on the cutting surface.

FIG. 6(b) is a front view illustrating shape of the cutting segment after cutting with the cutting segment of FIG. 6(a). Diamond particle layers positioned on the side of the cutting segment 8 are superimposed so that outermost and uppermost diamond particle rows 80 and 83 are protected from falling off. Therefore, the cutting segment 8 of the invention can maintain its shape without undergoing R wear during cutting as shown in FIG. 6(b).

Figure 7:
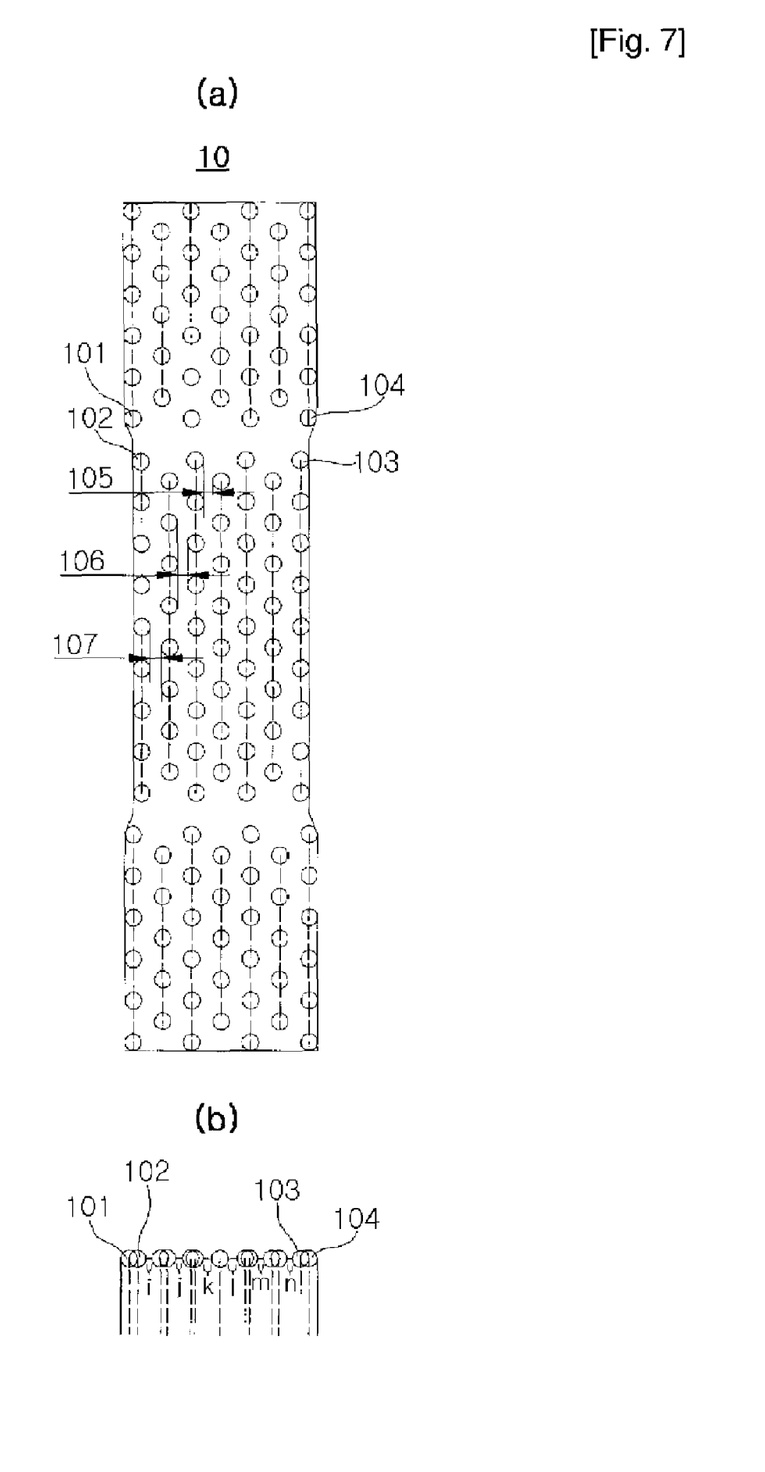
FIG. 7 is further another example of the cutting segment according to the invention, in which (a) shows a schematic view of a cutting surface, and (b) shows a front sectional view of the cutting segment along the cutting direction during cutting.

FIG. 7 shows further another example of a cutting segment having depressions formed on both sides according to the invention.

As shown in FIG. 7, the cutting segment 10 has depressions formed on both sides thereof and opposed ones of the depressions are symmetrical to each other.

As just described, the depressions are formed on the sides of the cutting segment 10 so that outermost diamond particle rows 101 and 104 positioned on the side of the cutting segment are superimposed with adjacent diamond particle rows 102 and 103 when seen from the front of the cutting segment in cutting direction.

In the cutting segment 10, diamond particle layers each are extended intermittently along the cutting direction and diamond particle rows 101 to 104 are arranged intermittently along the cutting direction on the cutting surface.

In regions defined by the depressions on the cutting segment 10, gaps between blank sections formed between diamond particle layers are smaller toward the inside of the cutting segment.

That is, gaps between the blank sections are greater in the sequence of gap 107>gap 106>gap 105.

FIG. 7(b) is a front view illustrating shape of a cutting segment after cutting with cutting segment of FIG. 7(a). Diamond particle layers are superimposed on the sides of the cutting segment 10 so that outermost diamond particle rows 101 and 104 of the cutting segment are protected from falling off. Consequently, the cutting segment 10 of the invention can maintain its shape without undergoing R wear during cutting as shown in FIG. 7(b).

In the cutting segment 10 like the cutting segments 6, 7, the depth of depressions may be varied to adjust gaps i,j,k,l,m and n between blank sections successively formed along the cutting direction. This thereby enables adjustment in cutting capacity and useful life.

Figure 8:
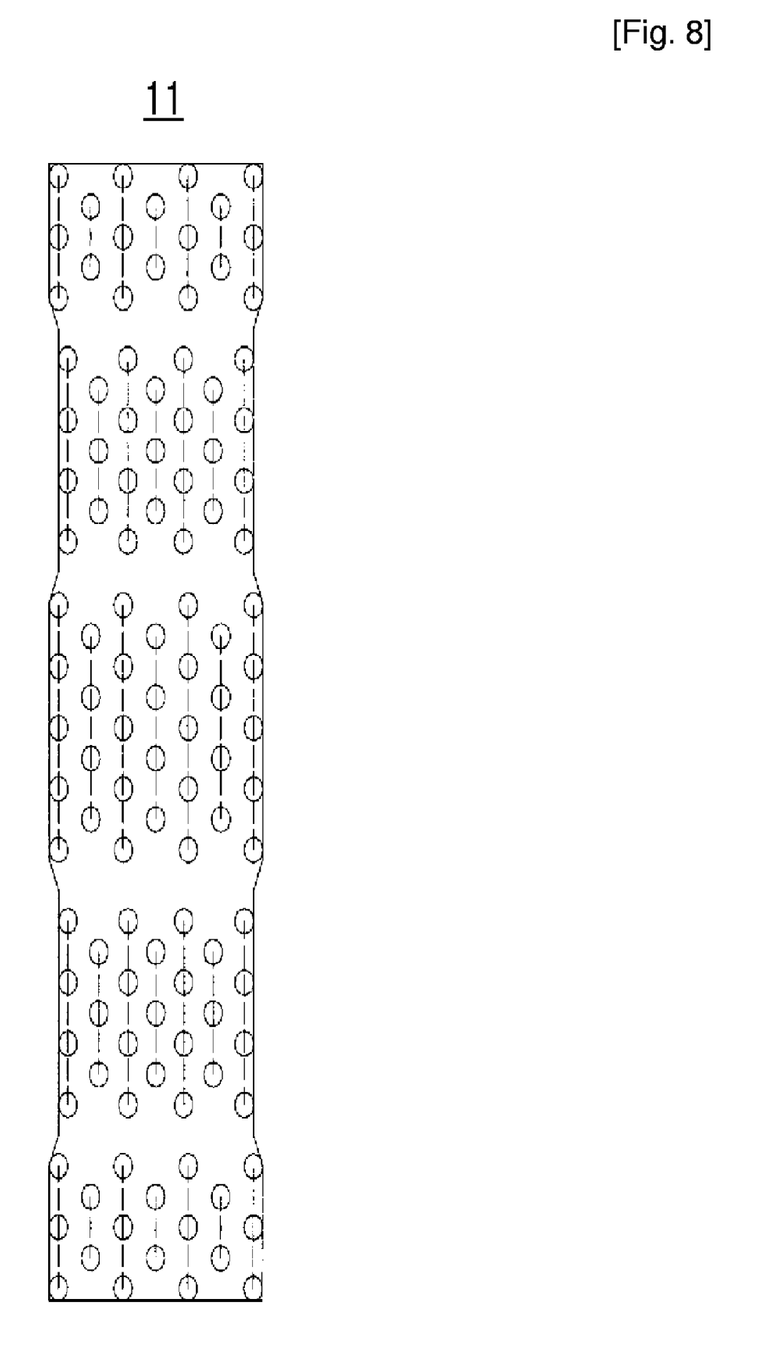
FIG. 8 is further another example of the cutting segment according to the invention.

Further, according to the invention, in forming opposed depressions symmetrical to each other, as in FIG. 7, at least two depressions may be formed on one side in accordance with length of the cutting segment, and size and concentration of diamond particles, as shown in FIG. 8.

Figure 9:
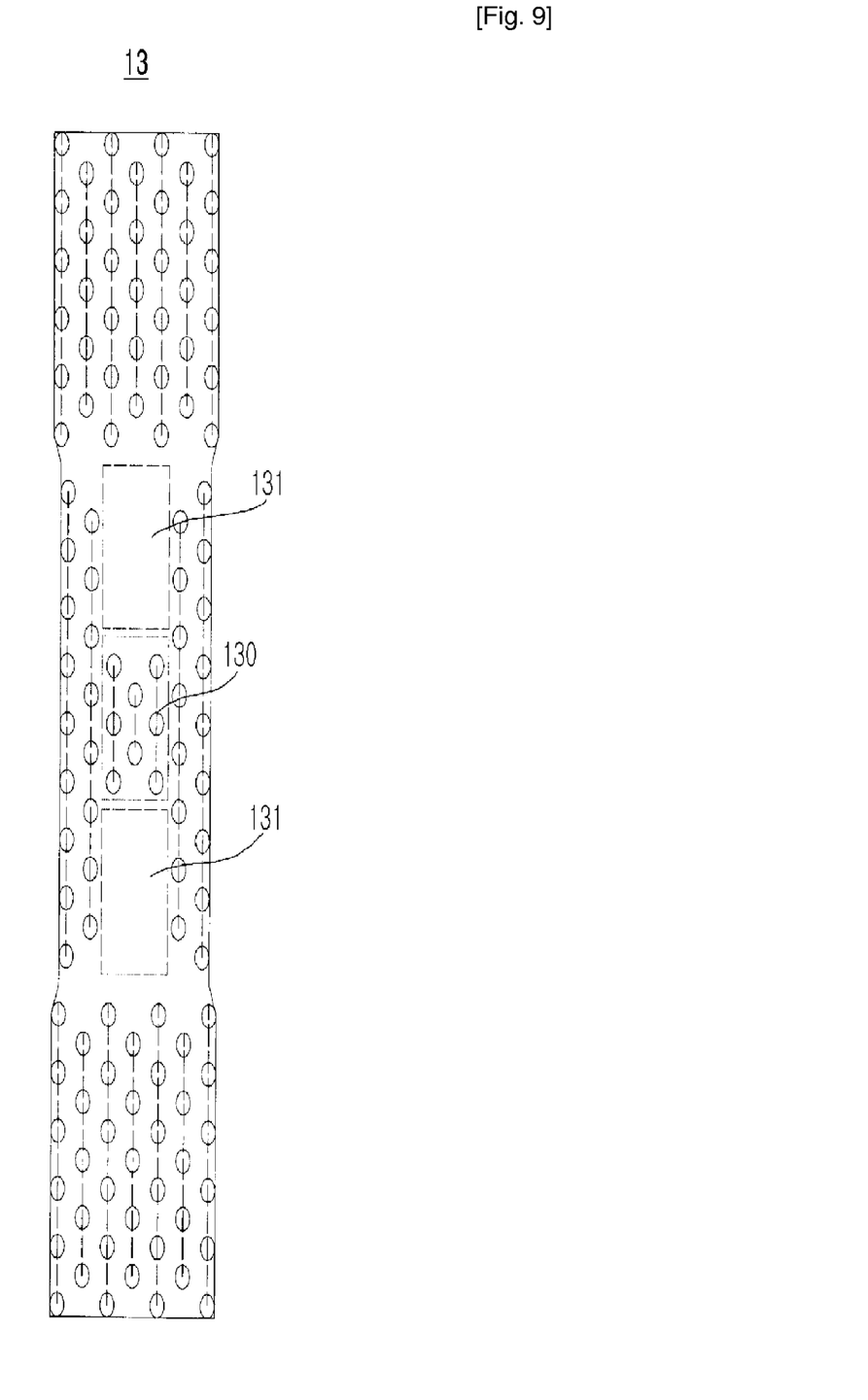
FIG. 9 is further another example of the cutting segment according to the invention.

In addition, according to the invention, as in FIG. 9, diamond particle rows of diamond particle layers, excluding outermost diamond particle layers and adjacent diamond particle layers placed in the depressions next to the outermost diamond particle layers, have at least one low-concentration area 131 and high-concentration area 130 alternating with each other on the cutting surface.

According to the invention, the depth, length and number of depressions can be varied adequately depending on size of the cutting segment, and concentration and size of diamond particles. However, preferably, the depth of depressions is smaller than a diameter of the diamond particles positioned on the side.

Also, the cutting segment may have at least one depression at one side or both sides thereof.

According to the invention, in the cutting segment having diamond particles arranged as just described, preferably, diamond particles should be protruded in rows at uniform spaces from the cutting surface of the cutting segment.

Diamond particles take the form of whole crystal, macro-fractured crystal, micro-fractured crystal, polishing, pull-out during cutting. But in fact the cutting process involves just diamond particles of whole crystal and micro-fractured crystal. Therefore the diamond particles positioned in the same phase should be arranged in rows to increase probability that more diamond particles are involved in cutting.

Also, preferably, with abrasion of the cutting segment, diamond particles arranged in rows should be protruded successively from the cutting surface.

Unless diamond particles are protruded successively on the cutting surface, the cutting surface has only metal binder without abrasive particles. This prevents the diamond tool from exhibiting uniform cutting rate, possibly lowering useful life thereof.

Therefore, preferably, in the cutting segment according to the invention, the diamond particle layers are arranged in rows on the cutting surface and the diamond particle rows are protruded successively.

Meanwhile, the diamond tool according to the invention may adopt only the cutting segment of the invention, or the cutting segment of the invention together with at least one conventional cutting segment.

The conventional cutting segment may include a cutting segment having diamond particles randomly arranged.

The diamond tool having the cutting segment of the invention including at least one conventional cutting segment exhibits less cutting rate and shorter useful life than the diamond tool having only the cutting segment of the invention, but shows greater cutting rate than the diamond tool having diamond particles randomly arranged.

Further, the invention may be applied to a cutting segment of a core bit having a plurality of cutting segments.

Preferably, in fabricating the cutting segment having diamond particles arranged according to the invention, at least two diamond particle layers are superimposed on the side to reduce R wear. Also, preferably, high wear-resistant filler is dispersed properly on areas having no diamond particles on the outer side of the cutting segment to prevent early abrasion thereof.

That is, preferably, according to the invention, filler (abrasive having high hardness) is added to metal binder to extend useful life of the diamond tool. This also allows improvement in wear-resistance of metal binder.

Particles having wear-resistance such as SiC, WC, BN, $Al_2O_3$ and diamond may be used as filler singly or complexly.

A material used as filler is added to prevent wear in the side so that in case of using diamond particles as filler, diamond particles added to the side as filler should have a concentration lower than that of diamond particles positioned in the center for cutting.

The invention provides the diamond tool having the cutting segment of the diamond tool of the invention as just described.

An explanation will be given hereunder regarding an example of a method for fabricating a diamond tool according to the invention.

A spray-type adhesive is coated onto a metal net cut in the shape of a cutting segment. Then a metal jig perforated with holes at a uniform interval by a laser process is placed thereon, and fine diamond particles are spread thereto.

Each diamond particle is placed in each hole.

With separation of the metal jig, a metal net having diamond particles uniformly arranged is obtained.

This metal net is cold-formed with metal binder, sintered and fabricated into the cutting segment.

At this time, in case of fabricating a cutting segment having at least two areas, upper and lower molds having a relief may be used for forming or sintering, but sintering is more preferable.

This method is widely used in the diamond tool industry.

The aforesaid method for fabricating the diamond tool of the invention is just one preferable example and the invention is not limited thereto.

Examples below are given for the purpose of explaining the invention in greater detail.

EXAMPLE 1

According to the invention, fabricated were 24 cutting segments in which at least two diamond particle layers were superimposed on the side (inventive cutting segment, shaped as in FIG. 4) and cutting segments in which side diamond particle layers are not superimposed with adjacent diamond particle layers (conventional cutting segment, shaped as in FIG. 2), respectively. To observe R wear, a 14 inch saw blade having 24 cutting segments was fabricated to conduct cutting tests. The results are shown in Table 1.

On a cutting surface of the inventive cutting segments, diamond particles were regularly arranged in five layers as in FIG. 4. A depth of depressions was 0.16 mm, which is 40% of the mean particle size (0.4 mm) of diamond particles arranged at the side of the cutting segments. Also, a length of depressions was 40% with respect to the total length of the cutting segment along the cutting direction.

The cutting segments were 40 mm in length, 10.2 mm in height, and 3.2 mm in thickness, and made of Co—Fe—Ni-based metal binder.

Diamond particle used herein was MBS 955 available from GE Corp of U.S.A, with a concentration of 0.9 cts/cc. Sintering was performed by hot press at a temperature of 860° C., and during a period of 5 minutes.

The cutting segments fabricated as above were fixed to a 14 inch core by laser welding. Concrete was cut with a depth of 35 mm and an area of 10 m².

A 6.5HP engine-driven cutting machine available from STIHL Corp. was used.

Diamond particles identical to those regularly arranged inside were used as fillers in the side of the cutting segment to prevent abrasion. In addition, the filler particles had 30% lower concentration than those arranged inside.

TABLE 1

| Sample No. | Cutting index (☐/min) | Cutting capacity (%) | Useful life index (☐/mm) | Useful life (%) |
|---|---|---|---|---|
| Inventive cutting segment | 1170.5 | 125 | 9.86 | 113 |
| Conventional cutting segment | 936.7 | 100 | 8.75 | 100 |

As shown in Table 1, inventive cutting segments according to the invention exhibit superior cutting rate and useful life to conventional cutting segments.

EXAMPLE 2

As shown in FIG. 4, cutting segments were fabricated in such a way that diamond particle layers positioned on the side are superimposed by forming depressions on the side of the cutting segment. Thereby, effects of the depth of depressions on cutting rate and useful life were identified. The depth of depressions was varied from 0.1 to 0.3 mm (Inventive cutting segments 1 to 3).

Inventive cutting segments 1 and 2 in Table 2 had 4 successive blank sections. A gap between blank sections of inventive cutting segment 1 was greater than that of inventive cutting segment 2. Inventive cutting segment 3 did not have successive blank sections.

Diamond particle layers in the cutting segment had a thickness of 0.4 mm, the mean particle size of diamond particles. Co—Fe—Ni-based alloy was used as metal binder. Diamond particle used herein was MBS 955 available from GE Corp. of U.S.A. Sintering was performed by hot press at a temperature of 860° C. and during a period of 5 minutes.

Other conditions of tests were equal to those of example 1.

Cutting rate and useful life were measured for the aforesaid cutting segments, and the results are shown in Table 2 below.

TABLE 2

| Sample No. | Depth of depression (mm) | Cutting index (☐/min) | Cutting capacity (%) | Useful life index (☐/mm) | Useful life (%) |
|---|---|---|---|---|---|
| Conventional cutting segment | None | 936.7 | 100 | 8.75 | 100 |
| Inventive cutting segment 1 | 0.1 | 1208.3 | 126 | 9.63 | 111 |
| Inventive cutting segment 2 | 0.2 | 1152.1 | 123 | 10.06 | 115 |
| Inventive cutting segment 3 | 0.3 | 1124.5 | 120 | 10.24 | 117 |

As shown in table 2, increase in a depth of depression leads to decrease in a gap between diamond particle layers (a gap between blank sections), thus extending useful life but diminishing cutting rate.

EXAMPLE 3

As shown in Table 3 below, inventive tools 1, 2 and a conventional tool were fabricated to examine cutting rate and useful life through cutting tests. Inventive tool 1 was a saw blade fixed with only inventive cutting segments 2 used in example 2. Inventive tool 2 was a saw blade fixed with inventive cutting segments 2 used in example 2 and cutting segments having diamonds randomly dispersed thereon (50%: 50%). Conventional tool was a saw blade fixed with only cutting segments having diamond particles randomly dispersed thereon.

Fe—Ni-based alloy was used as metal binder, and diamond particle used herein was MBS 955 available from GE Corp. of U.S.A. Sintering was performed via hot press at a temperature of 860° C. and during a period of 5 minutes.

Other conditions of tests were equal to those of example 1.

TABLE 3

| Sample No. | Cutting index (☐/min) | Cutting capacity (%) | Useful life index (☐/mm) | Useful life (%) |
|---|---|---|---|---|
| Conventional tool | 876.5 | 100 | 7.12 | 100 |
| Inventive tool 1 | 1152.1 | 131 | 10.06 | 141 |
| Inventive tool 2 | 1012.5 | 116 | 8.21 | 115 |

As shown in Table 3, inventive tool 2 according to the invention exhibits inferior cutting rate to inventive tool 1 but superior cutting rate and useful life to the conventional tool.

EXAMPLE 4

Saw blades fixed with conventional cutting segments and inventive cutting segments of example 1 were used to conduct cutting tests. To examine the extent of R wear, shapes of the front cutting segments fixed to the saw blades along the cutting direction were observed with optical microscope. The results are shown in FIG. 10.

FIG. 10(a) shows conventional cutting segments of example 1, and FIG. 10(b) shows inventive cutting segments of example 1.

Figure 10:
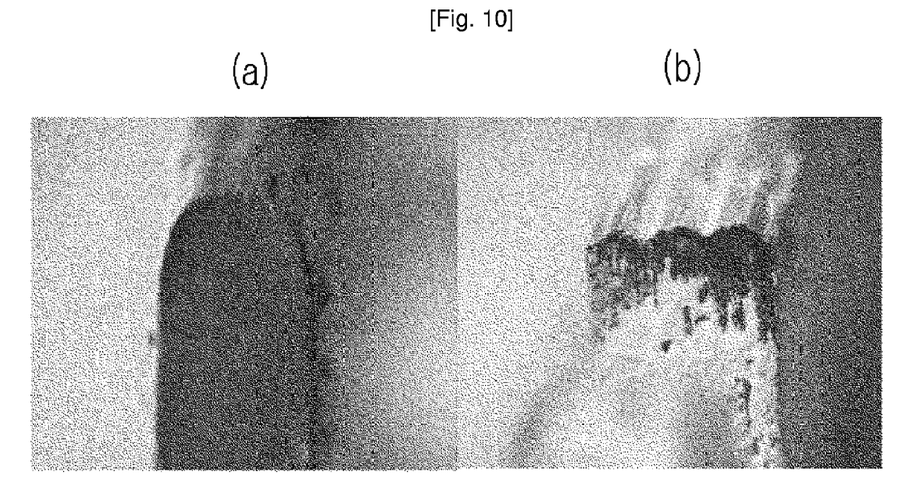
FIG. 10 is an optical microscope picture illustrating a front view of the cutting segment along the cutting direction after cutting via saw blades having conventional and inventive cutting segments, respectively.

As shown in FIG. 10, inventive cutting segments exhibit considerable reduction in R wear compared to conventional cutting segments.

While the present invention has been shown and described in connection with the preferred embodiments, it will be apparent to those skilled in the art that modifications and variations can be made without departing from the spirit and scope of the invention as defined by the appended claims.

INDUSTRIAL APPLICABILITY

As set forth above, the invention provides the cutting segment of the diamond tool which significantly reduces R wear that occurs during cutting, thus ensuring uniform cutting and has superior cutting rate and lengthy useful life, and the diamond tool having the same.

The invention claimed is:

1. A cutting segment of a diamond tool comprising:
at least five layers of diamond particles arranged in a plurality of plate-shaped layers stacked perpendicular to a cutting direction, each of the diamond particle layers having a plurality of particle rows on a cutting surface,
wherein at least two of the diamond particle layers are superimposed on both sides of the cutting segment seen from the front of the cutting segment in the cutting direction, and
wherein the diamond particle layers positioned inside the cutting segment are arranged so that at least two successive blank sections are formed along the cutting direction, and a gap exists between the at least two successive blank sections.

2. The cutting segment of the diamond tool according to claim 1, wherein the diamond particle layers each are extended successively along the cutting direction, and the diamond particle rows are arranged successively along the cutting direction.

3. The cutting segment of the diamond tool according to claim 2, wherein the diamond particle rows each are arranged successively on the cutting surface.

4. The cutting segment of the diamond tool according to claim 2, further comprising at least one filler dispersed on at least one side of the cutting segment, the filler selected from SiC, WC, BN, Al O and diamond.

5. The cutting segment of the diamond tool according to claim 1, wherein the diamond particle layers each are extended intermittently along the cutting direction, and the diamond particle rows are arranged intermittently along the cutting direction.

6. The cutting segment of the diamond tool according to claim 5, further comprising a depression on at least one side of the cutting segment.

7. The cutting segment of the diamond tool according to claim 6, wherein the depression comprises a plurality of depressions formed on both sides of the cutting segment, and opposed ones of the depressions are overlapped with each other.

8. The cutting segment of the diamond tool according to claim 6, wherein the depression comprises a plurality of depressions formed on both sides of the cutting segment, and opposed ones of the depressions are symmetric to each other.

9. The cutting segment of the diamond tool according to claim 8, wherein the diamond particle rows of the diamond particle layers, excluding outermost diamond particle layers and diamond particle layers adjacent to the depressions, have at least one low-concentration area and high-concentration area alternating with each other on the cutting surface.

10. The cutting segment of the diamond tool according to any one of claims 6 to 9, wherein the cutting segment has at least two depressions formed on one side or both sides of the cutting segment, respectively.

11. The cutting segment of the diamond tool according to claim 10, wherein the diamond particle rows each are arranged successively on the cutting surface.

12. The cutting segment of the diamond tool according to claim 10, further comprising at least one filler dispersed on at least one side of the cutting segment, the filler selected from SiC, WC, BN, Al O and diamond.

13. The cutting segment of the diamond tool according to any one of preceding claims 1, 6, 7, 8, and 9, wherein the diamond particle rows each are arranged successively on the cutting surface.

14. The cutting segment of the diamond tool according to claim 13, further comprising at least one filler dispersed on at least one side of the cutting segment, the filler selected from SiC, WC, BN, Al O and diamond.

15. The cutting segment of the diamond tool according to claim 5, wherein the diamond particle rows each are arranged successively on the cutting surface.

16. The cutting segment of the diamond tool according to any one of the preceding claims 1, 6, 8, 9, 3, and 15, further comprising at least one filler dispersed on at least one side of the cutting segment, the filler selected from a group consisting of SiC, WC, BN, Al O and diamond.

17. The cutting segment of the diamond tool according to claim 16, wherein the filler comprises diamond particles, the diamond particles added as the filler have a concentration of 10 to 60% with respect to that of the diamond particles for cutting.

18. The cutting segment of the diamond tool according to claim 5, further comprising at least one filler dispersed on at least one side of the cutting segment, the filler selected from SiC, WC, BN, Al O and diamond.

19. The cutting segment of the diamond tool according to any one of the preceding claims 4 and 18, wherein the filler comprises diamond particles, the diamond particles added as the filler have a concentration of 10 to 60% with respect to that of the diamond particles for cutting.

20. A diamond tool comprising a cutting segment as described in claim 1.

21. A diamond tool comprising a cutting segment as described in claim 1 and at least one conventional cutting segment.

22. The diamond tool according to claim 21, wherein the conventional cutting segment has diamond particles arranged randomly.

* * * * *

UNITED STATES PATENT AND TRADEMARK OFFICE
CERTIFICATE OF CORRECTION

| | |
|---|---|
| PATENT NO. | : 7,661,419 B2 |
| APPLICATION NO. | : 11/911798 |
| DATED | : February 16, 2010 |
| INVENTOR(S) | : Soo-Kwang Kim et al. |

Page 1 of 1

It is certified that error appears in the above-identified patent and that said Letters Patent is hereby corrected as shown below:

IN THE CLAIMS:

In Column 10, line 54, claim 16: Replace "1, 6, 8, 9, 3, and 15", with --1, 6, 8, 9, 13, and 15--.

Signed and Sealed this

Ninth Day of November, 2010

David J. Kappos
*Director of the United States Patent and Trademark Office*